(12) United States Patent
Eckstine

(10) Patent No.: US 6,473,715 B1
(45) Date of Patent: Oct. 29, 2002

(54) LUFFING ANGLE MEASUREMENT SYSTEM

(75) Inventor: Dennis W. Eckstine, Waynesboro, PA (US)

(73) Assignee: Grove U.S. L.L.C., Shady Grove, PA (US)

(*) Notice: Subject to any disclaimer, the term of this patent is extended or adjusted under 35 U.S.C. 154(b) by 0 days.

(21) Appl. No.: 09/205,295

(22) Filed: Dec. 4, 1998

Related U.S. Application Data

(60) Provisional application No. 60/067,815, filed on Dec. 5, 1997, and provisional application No. 60/069,055, filed on Dec. 10, 1997.

(51) Int. Cl.⁷ .............................................. B66C 13/48
(52) U.S. Cl. ...................... 702/151; 702/150; 702/159; 340/685
(58) Field of Search ............................ 702/151, 33, 36, 702/42, 38–40, 94, 95, 97, 149, 150, 152, 153, 159, 183, 171–173, 174, 175, FOR 130, FOR 134, FOR 135, FOR 144, FOR 146, FOR 170, FOR 171, FOR 123, FOR 124, FOR 126; 701/50, 124; 356/152.2, 3, 3.06, 5.01, 5.08, 152.1; 342/27, 28; 340/685, 689; 212/276–278, 233; 73/1.75, 1.79; 414/141.6, 686, 699

(56) References Cited

U.S. PATENT DOCUMENTS

| | | | | | |
|---|---|---|---|---|---|
| 3,079,080 A | * | 2/1963 | Mason | ........................ | 701/124 |
| 3,740,534 A | * | 6/1973 | Kezer et al. | ................... | 701/50 |
| 3,819,922 A | * | 6/1974 | Horn et al. | ................... | 701/50 |
| 4,052,602 A | * | 10/1977 | Horn et al. | ................... | 701/50 |
| 4,216,868 A | * | 8/1980 | Geppert | ....................... | 340/685 |
| 5,519,400 A | | 5/1996 | McEwan | ....................... | 342/28 |
| 5,521,600 A | | 5/1996 | McEwan | ....................... | 342/27 |
| 5,581,256 A | | 12/1996 | McEwan | ....................... | 342/27 |
| 5,729,339 A | | 3/1998 | Park et al. | ................... | 356/152.2 |
| 5,745,442 A | * | 4/1998 | Herscher | ................... | 356/5.08 |
| 5,823,370 A | * | 10/1998 | Ueda | ........................... | 212/276 |
| 6,057,777 A | * | 5/2000 | Dunne et al. | ................ | 340/685 |

FOREIGN PATENT DOCUMENTS

| | | |
|---|---|---|
| CA | 1177959 | 11/1984 |
| DE | 4402787 A1 | 1/1994 |
| EP | 0812797 A1 | 12/1997 |
| JP | 57132012 | 8/1982 |
| WO | WO9211508 | 7/1992 |
| WO | WO9626883 | 6/1996 |
| WO | WO9745358 A | 12/1997 |

OTHER PUBLICATIONS

"Micropower Impulse Radar (MIR) Technology Overview," Site visited Dec. 29, 1996, 3 pages.

* cited by examiner

*Primary Examiner*—Hal Wachsman
(74) *Attorney, Agent, or Firm*—Birch, Stewart, Kolasch & Birch, LLP

(57) ABSTRACT

The luffing angle measurement system includes a non-contact distance measuring device mounted on the nose section of a first boom. The non-contact distance measuring device measures either a distance to a second boom pivotally connected to the first boom or measures a time delay between the transmission of electromagnetic energy towards the second boom and reception of electromagnetic energy reflected from the second boom. A controller then converts the measured distance or the measured time delay into a luffing angle.

16 Claims, 1 Drawing Sheet

LUFFING ANGLE MEASUREMENT SYSTEM

This application claims priority on provisional application Ser. No. 60/067,815 filed on Dec. 5, 1997 and Ser. No. 60/069,055 filed on Dec. 10, 1997, the entire contents of which are hereby incorporated by reference.

BACKGROUND OF THE INVENTION

1. Field of the Invention

The present invention relates to a luffing angle measurement system.

2. Description of Related Art

Cranes and aerial work platforms use many devices to detect the distance to, the length of and/or the position of an element, such as a boom, forming a portion of the crane or aerial work platform. These devices rely on contact between the device and a portion of the element having its position and/or length detected. Devices which rely on contact, however, have a limited life span because each physical contact serves to wear and degrade the device. Contact devices also fail because of external factors which prohibit the detection of contact. For instance, most contact devices use electrical switches, and ice and freezing rain can prevent such switches from functioning.

Furthermore, most contact devices only provide a discrete measurement. When contact occurs, this contact indicates that, for example, the boom is at a predetermined position or at a predetermined length. Such contact devices can not supply a continuously varying real-time measurement. Contact devices also have slow response times. The boom will no longer be in the predetermined position by the time the detected contact is processed. Accordingly, contact devices include a certain amount of error.

SUMMARY OF THE INVENTION

According to one embodiment, the luffing angle measurement system according to the present invention includes a non-contact distance measuring device mounted on the nose section of a first boom. The non-contact distance measuring device measures the distance to a second boom pivotally connected to the first boom. The non-contact distance measuring device is mounted to the nose section such that as the luffing angle between the first and second booms increases, the distance measured by the non-contact distance measuring device also increases. A controller converts the measured distance into a luffing angle.

In another embodiment of the luffing angle measurement system according to the present invention, a non-contact measuring device is mounted on a nose section of a first boom, and transmits electromagnetic energy towards a second boom pivotally connected to the first boom. The non-contact measuring device receives the electromagnetic energy reflected from the second boom, and measures the time delay between transmission of the electromagnetic energy and reception of the reflected electromagnetic energy. The non-contact measuring device is mounted on the nose section such that as the luffing angle between the first and second booms increases, the measured time delay increases. A controller converts the measured time delay into a luffing angle.

Accordingly, the present invention provides a luffing angle measurement system which does not rely on physical contact, and therefore, does not suffer from the problems and disadvantages associated with such contact oriented devices.

Other objects, features, and characteristics of the present invention; methods, operation, and functions of the related elements of the structure; combination of parts; and economies of manufacture will become apparent from the following detailed description of the preferred embodiments and accompanying drawings, all of which form a part of this specification, wherein like reference numerals designate corresponding parts in the various figures.

BRIEF DESCRIPTION OF THE DRAWINGS

The present invention will become more fully understood from the detailed description given hereinbelow and the accompanying drawing which is given by way of illustration only, and thus are not limitative of the present invention, and wherein.

DETAILED DESCRIPTION OF THE PREFERRED EMBODIMENTS

Figure 1:
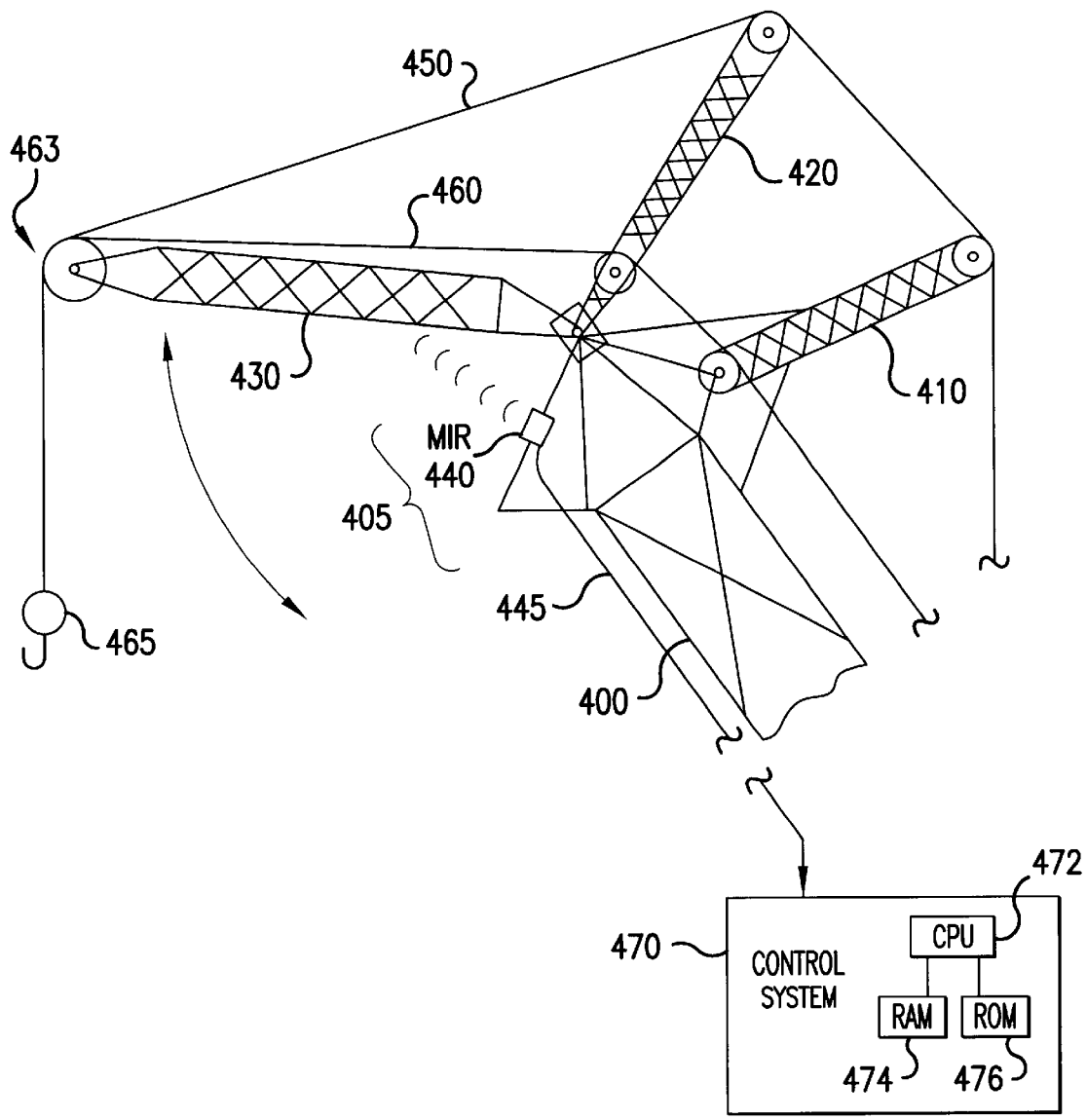
FIG. 1 illustrates an embodiment of a luffing angle measurement system according to the present invention.

FIG. 1 illustrates a luffing angle measurement system according to the present invention. As shown, a luffing jib 430 is pivotally connected to a nose section 405 of a main boom 400. A first cable 450 connected to a nose section 463 of the luffing jib 430 controls the elevation (i.e., pivotal movement) of the luffing jib 450. A strut 420 and a control arm 410 support the first cable 450, and help stabilize the luffing jib 430.

A second cable 460, supported by the luffing jib 430, is connected to a hookblock 465. The second cable 460 is further supported by the strut 420 and the control arm 410. During operation, a first hoist (not shown) controls the movement of the first cable 450; and thus, the elevation of the luffing jib 430. A second hoist (not shown) controls the movement of the second cable 460; and thus, the movement of the hookblock 465.

Depending on the load being lifted and the height to which the load needs to be lifted, the luffing jib 430 is set at a certain elevation. An MIR (micro-impulse radar) system 440 is mounted to the nose section 405 of the main boom 400. As is well-known, MIR systems emit short-range ultra-wideband pulses, and detect the reflection of these pulses off of a body. Based on the reflected pulses, namely, the time delay between transmission and reception of the pulses, the MIR systems determine, among other things, the distance to the body. The MIR system 440 is mounted on the nose section 405 such that the antennas thereof (not shown) emit pulses which reflect off of the luffing jib 430. More specifically, the MIR system 440 is mounted such that the MIR system 440 receives reflected pulses from the luffing jib 430 when the luffing jib 430 forms an angle with the main boom 400 which ranges from 0 to greater than 90 degrees, but less than 180 degrees. The maximum elevation of the luffing jib 430 at which the MIR system 440 receives reflected pulses therefrom depends upon the length of the luffing jib 430.

As the angle between the luffing jib 430 and the main boom 400 increases, the distance between the MIR system 440 and the luffing jib 430 increases. The MIR system 440 outputs this distance measurement to a control system 470 via an electric cable 445. The control system 470 includes a processor 472 connected to a RAM 474 and a ROM 476. The control system 470 stores either a look-up table or equation for converting the distance measurement into the elevation angle of the luffing jib 430 (i.e., the angle between the luffing jib 430 and the main boom 400), and converts the distance measurement output by the MIR system 440 into the elevation angle.

Instead of supplying a distance measurement, the MIR system 440 can be configured to supply the time delay between transmission and reception of pulses. In this alternative embodiment, the control system 470 stores a look-up table which converts the time delay into the elevation angle.

Instead of using MIR systems to detect the obstacle, any device which measures the distance to a body or surface without relying on contact such as sonic, ultra-sonic, infrared and laser distance measuring devices, may be used.

The invention being thus described, it will be obvious that the same may be varied in many ways. Such variations are not to be regarded as a departure from the spirit and scope of the invention, and all such modifications as would be obvious to one skilled in the art are intended to be included within the scope of the invention.

What is claimed:

1. A luffing angle measurement system, comprising:

a non-contact distance measuring device mounted on a nose section of a first boom, transmitting electromagnetic energy towards a second boom pivotally connected to the first boom, receiving electromagnetic energy reflected from the second boom, and measuring a distance to the second boom pivotally connected to the first boom, the non-contact distance measuring device mounted to the nose section of the first boom such that as a luffing angle between the second boom and the first boom increases, the measured distance output by the non-contact distance measuring device increases; and a controller converting the measured distance into a luffing angle.

2. The system of claim 1, wherein the non-contact distance measuring device is a micro-impulse radar.

3. The system of claim 1, wherein the non-contact distance measuring device is a sonic distance measuring device.

4. The system of claim 1, wherein the non-contact distance measuring device is an ultrasonic distance measuring device.

5. The system of claim 1, wherein the non-contact distance measuring device is an infra-red distance measuring device.

6. The system of claim 1, wherein the non-contact distance measuring device is a laser distance measuring device.

7. The system of claim 1, wherein the controller converts the measured distance into the luffing angle using a look-up table.

8. The system of claim 1, wherein the controller converts the measured distance into the luffing angle using an equation.

9. A luffing angle measurement system, comprising:

a non-contact measuring device mounted on a nose section of a first boom, transmitting electromagnetic energy towards a second boom pivotally connected to the first boom, receiving electromagnetic energy reflected from the second boom, and measuring a time delay between transmission of the electromagnetic energy and reception of the reflected electromagnetic energy, the non-contact measuring device mounted on the nose section of the first boom such that as a luffing angle between the second boom and the first boom increases, the measured time delay output by the non-contact measuring device increases; and a controller converting the measured time delay into a luffing angle.

10. The system of claim 9, wherein the non-contact measuring device is a micro-impulse radar.

11. The system of claim 9, wherein the non-contact measuring device is a sonic distance measuring device.

12. The system of claim 9, wherein the non-contact measuring device is an ultrasonic distance measuring device.

13. The system of claim 9, wherein the non-contact measuring device is an infra-red distance measuring device.

14. The system of claim 9, wherein the non-contact measuring device is a laser distance measuring device.

15. The system of claim 9, wherein the controller converts the measured time delay into the luffing angle using a look-up table.

16. The system of claim 9, wherein the controller converts the measured time delay into the luffing angle using an equation.

\* \* \* \* \*